Aug. 20, 1935.   B. W. TWYMAN   2,012,028
STEERING GEAR
Filed Jan. 23, 1932
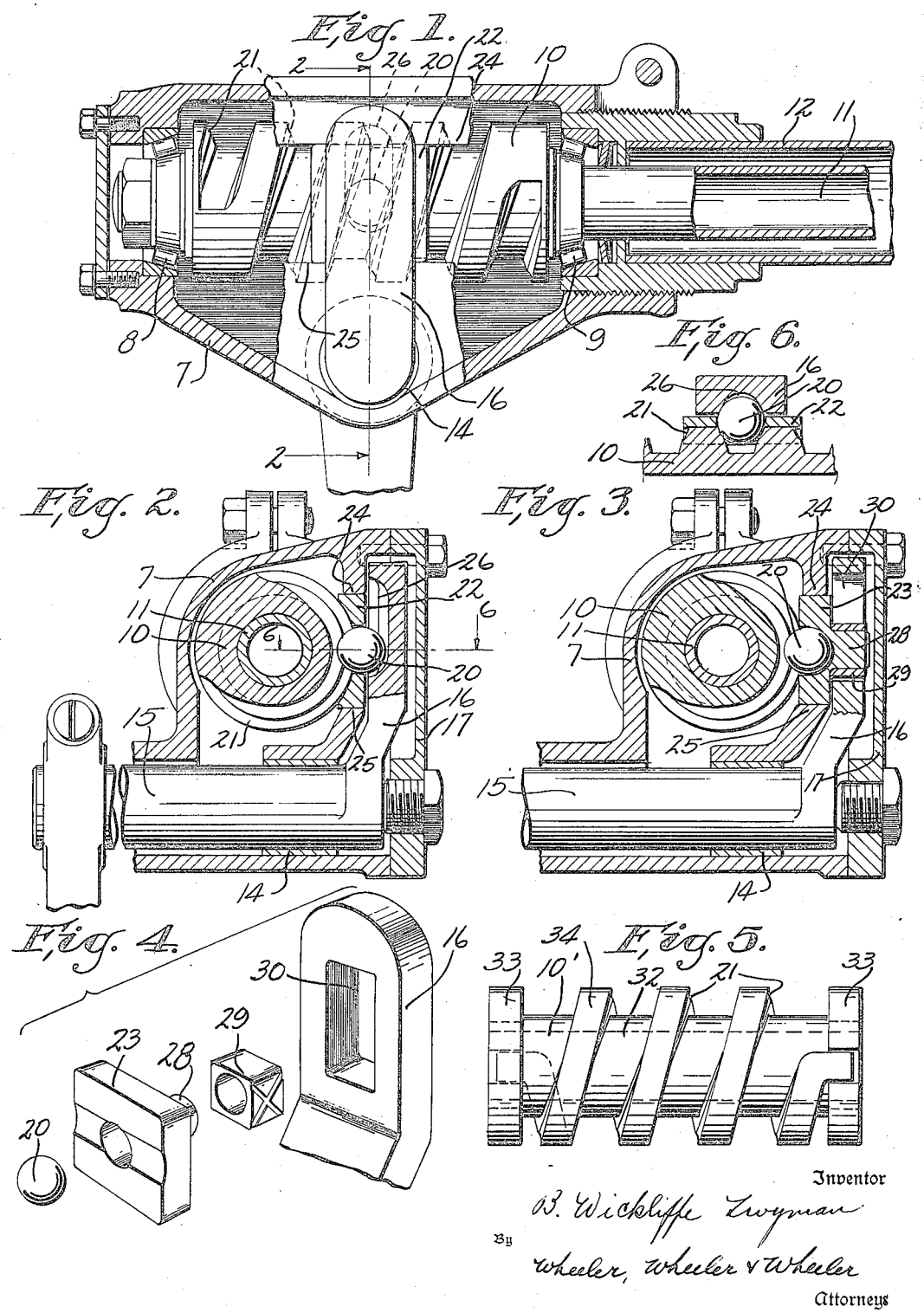
Inventor
B. Wickliffe Twyman
By Wheeler, Wheeler & Wheeler
Attorneys Patented Aug. 20, 1935

2,012,028

UNITED STATES PATENT OFFICE 2,012,028

STEERING GEAR

B. Wickliffe Twyman, Indianapolis, Ind., assignor to Lavine Gear Company, Milwaukee, Wis., a corporation of Wisconsin Application January 23, 1932, Serial No. 588,304

25 Claims. (Cl. 74—500)

This invention relates to improvements in steering gears. One of the most important objects of the invention is to provide a novel and improved means for successfully increasing the mechanical advantage of the driving screw over the driven rock shaft in a steering gear in accordance with the displacement from the normal centralized position of the rock shaft. It is well known that as the displacement of the dirigible wheels of a vehicle from their normal forwardly directed position is increased, the resistance to turning or steering movement of the wheel is correspondingly increased. Accordingly steering gears have been designed to provide increased advantage, but in the past the increase in mechanical advantage has been quite largely absorbed through a correspondingly increased friction.

Through the construction herein disclosed I have succeeded in making the increased mechanical advantage of the mechanism at the extremes of its range of movement effective through the use of a rolling ball meshing with the driving screw and guided for rectilinear movement parallel to the axis of the screw. I am aware that other steering gears such for example as those shown in U. S. Patent 1,725,737 and 1,725,738 have attempted to employ a rolling ball to receive motion from a steering gear screw but in the present device I propose to render the gear less expensive and more effective by the use of means guiding the ball for rectilinear movement along a conventional cylindrical screw in place of the special concave spiral screw shown and required in the construction of said patents.

It is a further very important object of the present invention to provide means whereby the driven ball is guided for its desired rectilinear movement directly from the gear casing itself.

It is also my purpose to provide, for certain uses, a simplified form of steering gear in which a single ball moves axially of the screw and has a limited range of radial movement relatively to the driven rocker arm in the course of oscillation of said arm. In another embodiment of my invention herein disclosed I provide a socket for the ball in a slide having the desired radial movement with respect to said arm.

It is one of my objectives to enable steering gear manufacturers to employ in an unusually frictionless gearing conventional helical screw of cylindrical contour, but it is my further purpose to simplify the construction of such a screw by the provision of a spring screw of special design as hereinafter disclosed.

In the drawing:

Fig. 1 shows in generally longitudinal section a steering gear embodying this invention.

Fig. 2 shows the gear in transverse section in the plane indicated at 2—2 in Fig. 1.

Fig. 3 is a sectional view similar to Fig. 2 showing a modified embodiment of the invention.

Fig. 4 illustrates in perspective the disassociated parts employed in the construction shown in Fig. 3.

Fig. 5 is a detailed view in side elevation of a modified form of screw which may be used in the gears herein disclosed.

Fig. 6 is a fragmentary detail in cross section in the plane indicated at 6—6 in Fig. 2.

Like parts are identified by the same reference characters throughout the several views.

The gear casing 7 provides the usual bearings at 8 and 9 for the steering gear screw, worm, or cam 10 which is mounted upon and receives motion from the steering shaft 11 in steering column 12. Bearing means is also provided in the casing at 14 for the driven rock shaft 15 which carries a rocker arm 16 preferably enclosed by the removable closure 17 applied to the side of the gear casing.

The thread of the screw 10 is preferably not machined to a spherical cross section. In lieu thereof, the thread is merely cut in a tapering form and a suitable bearing surface for the ball 20 is rolled into the thread at 21 by operating the thread of the screw upon a ball held thereto under high pressure. Thus a smooth accurately finished surface is provided at nominal expense in an otherwise conventional screw thread.

As above noted, it is important to the invention that the single ball 20 which meshes with screw 10 shall be guided for rectilinear movement parallel to the axis of the screw. Such guidance is achieved through the use of ball carrier slides 22 and 23 in Figs. 2 and 3 respectively, each such slide preferably having bearing directly upon a portion of the casing 7. Suitable guideways may be provided by machining the margins of flanges 24 and 25 so that the slides 22 or 23 may reciprocate freely between the opposed margins of said flanges.

In the construction shown in Fig. 2 the ball 20 is held in an opening in the slide plate 22 through which the ball projects for engagement directly with the rocker arm 16. The rocker arm has a radial groove at 26 to receive the ball and to enable its thrust, derived from the screw, to be transmitted to the rocker arm 16 by the oscillation of rocker shaft 15. In the course of oscillation of the rock shaft, arm 16 will swing through an arc at right angles to that diametrical plane of the driving screw 10 in which ball 20 operates. In the central position of arm 16 in which the parts are shown, the ball will contact arm 16 at a minimum radius thereof and as the rock shaft 15 and arm 16 are oscillated to displace the steering wheels, there will be a corresponding relative movement between ball 20 and arm 16 tending to increase the effective radius of said arm at which it is engaged by the ball. As above noted, this has an importantly advantageous result in increasing the mechanical advantage of the screw over the driven rock shaft 15. Furthermore, the use of the ball as herein disclosed, serves to eliminate quite largely the increased friction which would otherwise result from the transmission of motion to the rocker arm at such an angle of thrust as that in which the pressure of the ball is necessarily applied.

As shown in Fig. 6, the contact between the ball and screw is preferably (although not necessarily) limited to the one eighth portion of the spherical surface of the ball, at each side thereof, which is closest to the median plane of the ball paralleling the axis of the screw. If contact were made outside this area the thrust outward would exceed the thrust in the direction of operation. Similarly the contact between the ball and the rolled surfaces at the sides of the rocker arm groove are preferably limited to the area nearest the central plane at or near which the ball is engaged by its guide plate 22. A thrust bearing or plunger 26a is carried by the closure 17 and is preferably permanently adjusted for the desired running clearance or degree of tightness of the parts.

The construction shown in Fig. 3 is adapted for heavy duty. The ball slide 23 is socketed or recessed instead of being apertured as is the slide 22 in Fig. 2. In the Figure 3 construction the ball itself does not engage the rocker arm but, instead, the thrust of the ball is transmitted through slide 23, trunnion 28 and a secondary slide 29 journaled on the trunnion and operating radially in a guide slot 30 of arm 16. Whereas slide 22 in Figure 2 performs merely a ball guiding function and transmits no gear thrust, the slide 23 in Figure 3 is thus employed not only to guide the ball but also to transmit the thrust thereof to rocker arm 16 with gradually increasing mechanical advantage as the rocker arm is displaced.

In both embodiments of the invention steering is accomplished far more easily than with any previously known gear, due in part to the rectilinear ball movement and in part to the centralization of all thrusts on or closely adjacent to the motion transmitting ball which is employed. It is particularly to be noted that the screw is subjected to no greater load than it would receive in a more conventional steering gear design. The fact that the ball carrier or guiding slides take their position directly from the casing relieves the screw from any excess loading.

The functioning of the gear herein disclosed is such that economies may be effected in the manufacture of the screw by a special construction in which much machining is eliminated. In Figure 5 I have illustrated a screw 10' comprising a spool shaped member made up of a spindle or shaft 32 having radially notched heads 33. A spring rod is mounted into a helix 34 preferably of slightly smaller diameter than the spindle portion 32 of the spool and is then expanded to receive such spindle portion. The ends of the helix are interlocked with the grooves of heads 33 to provide an equivalent for the machined screw shown in Figure 1. Thereupon, the ball track is rolled into the convolutions and the helix 34 in the manner previously described herein.

I claim:

1. In a steering gear, the combination with a screw and a member to receive motion therefrom, of means for communicating motion from said screw to said member including a ball meshing with said screw, and an apertured guide confining said ball for movement upon a predetermined path and through which said ball projects into engagement with said member.

2. In a steering gear, the combination with a screw and a radially slotted rocker arm, of a ball meshed with the thread of the screw and with the slot of the rocker arm.

3. In a steering gear, the combination with a screw and a radially slotted rocker arm, of a ball meshed with the thread of the screw and with the slot of the rocker arm, and means for guiding said ball upon a rectilinear path substantially paralleling the axis of said screw.

4. In a steering gear, the combination with a screw and an adjacent rocker arm, of a slide reciprocable between said screw and rocker arm and provided with an opening, a ball confined within said opening and meshing with said screw, and means on said rocker arm providing a radial track in which said ball is engaged.

5. In a steering gear, the combination with a ball, of a screw meshing therewith having a tapered thread rolled to provide a helical seat for said ball.

6. In a steering gear, the combination with a screw and a member to be driven therefrom, of a ball connected with said member and engaged between consecutive turns of the threads of said screw, said screw being formed with a thread of such section as to contact said ball only at such portions that the thrust of the screw on the ball in the course of screw rotation will be greater in the direction of the axis of the screw than in the direction of its radius.

7. In a steering gear, the combination with a screw and a member to be driven therefrom, of a ball engaged with said member and with outer peripheral portions of consecutive turns of the thread of said screw, said thread being relieved to clear said ball except for said outer peripheral portions which are shaped to contact said ball within that one eight portion of its peripheral surface which, at each side of said ball, lies most closely adjacent to a median of said ball paralleling the axis of said screw.

8. In a steering gear, the combination with a screw, of a member mounted for oscillation and arranged to be driven from said screw and provided with a radial groove, and a ball engaging the portions of said member opposite across said groove and the outer peripheral portions of consecutive threads of said screw, the said portions of said screw and member having bearing surfaces spaced to engage only those ball portions adjacent the central median plane of said ball by the said screw and member.

9. In a steering gear, the combination with a ball, of a screw meshing therewith having tapered thread provided at each side upon its outer peripheral portions with a concave ball seat engaging said ball, all other portions of said screw being spaced from the ball so engaged.

10. In a steering gear, the combination with a ball, of a screw meshing therewith and providing spaced bearing surfaces concavely conforming to the surface of the ball substantially at a minor chord thereof subtended by arcs representing one eighth of the periphery of the ball and drawn from a median plane of the ball parallel to the axis of the screw.

11. In a steering gear, the combination with a screw, a rock shaft, a radially slotted rocker arm fixed with said shaft and a ball meshed with the thread of the screw and with the slot of the rocker arm, of a thrust bearing operative axially of said shaft and positioned to receive the outward thrust of said screw against said ball.

12. In a steering gear, the combination with a screw, rocker means comprising a rock shaft and a radially slotted rocker arm carried thereby, and a ball meshed with the thread of said screw and with the slot of the rocker arm, of means for guiding said ball upon a rectilinear path substantially paralleling the axis of said screw, said means including a thrust bearing operative upon said rocker means.

13. In a steering gear, the combination with a gear casing providing a guideway, a screw rotatable within said casing about an axis substantially parallel with the guideway, a rock shaft provided with an arm movable in a plane substantially parallel with and adjacent said screw with the guideway interposed between the arm and screw, of a ball carrier slide controlled as to its movement by said guideway, a ball held by said carrier in mesh with said screw in motion transmitting relation to said arm, and means whereby the ball is held by the carrier substantially in the direct line of thrust between the screw carrier and driven member in all positions of the driven member.

14. In a steering gear, the combination with a screw and a casing therefor, of a driven member movable adjacent said screw, means, connected with the casing, providing a guideway extending parallel with the axis of the screw between said screw and member, a slide reciprocable along said guideway, means for transmitting motion from said screw to said driven member, including a ball loosely fitted to said slide to receive guidance therefrom, said ball being held by the slide in engagement with the screw and driven member substantially at the point of their greatest proximity to each other in all positions of the driven member, and means for sustaining the outward thrust of said screw against said ball independently of said guideway.

15. In a steering gear, the combination with a worm cam screw and an associated rocker arm adapted for swinging movement in a plane substantially parallel to the axis of the screw, of an interposed ball carrier, a ball loosely engaging the screw, the carrier, and the rocker arm for motion transmission between the screw and rocker arm, and means for relieving the ball carrier from the major portion of the thrust exerted by the ball when actuated by the cam screw, including a casing formed to guide said carrier along a line substantially parallel to the axis of the screw in a plane including the point of ball engagement with said arm.

16. In a steering gear, the combination, with a worm cam screw and an associated rocker arm adapted for swinging movement in a plane substantially parallel to the axis of the screw, of an interposed ball carrier and a casing formed to guide said carrier along a line substantially parallel to the axis of the screw, a ball loosely engaging the screw, the carrier, and the rocker arm for motion transmission between the screw and rocker arm; and means for relieving the ball carrier from the major portion of the thrust exerted by the ball when actuated by the cam screw, said rocker arm having a ball receiving groove adapted to allow relative movement of the ball longitudinally of the arm while imparting swinging movement thereto.

17. In a steering gear, the combination with a screw and a rocker arm having a longitudinally extending way, of a ball between said screw and rocker arm meshing with said screw in a diametrical line substantially parallel to the pivotal axis of said rocker arm, a ball carrier slide having a socket in which said ball is positioned, means guiding said slide for rectilinear movement along a path substantially paralleling the axis of the screw, a trunnion carried by said slide, and a secondary slide thereon movable longitudinally in the rocker arm way.

18. In a steering gear, the combination with a screw and a rocker arm having a longitudinally extending way, of a ball between said screw and rocker arm meshing with said screw in a diametrical line substantially parallel to the pivotal axis of said rocker arm, a ball carrier slide having a socket in which said ball is positioned, means guiding said slide for rectilinear movement along a path substantially paralleling the axis of the screw, a trunnion carried by said slide, a secondary slide thereon movable longitudinally in the rocker arm way, and means associated with the rocker arm for receiving the outward thrust transmitted by the screw through said ball.

19. In a steering gear, the combination with a driving worm cam screw and an oscillatory driven member movable in a plane parallel to the axis of the screw, of a ball carrier interposed in the space between the screw and said member and supported for movement in said space along a line parallel with the axis of the screw, a ball mounted on the ball carrier in motion transmitting relation to the screw and driven member, and means whereby the ball is held by the carrier for transmission of thrust substantially in the direct line between the screw and carrier and driven member in all positions of the driven member.

20. In a steering gear, the combination with a driving worm cam screw and a driven member movable in a plane parallel to the axis of the screw, of a carrier interposed in the space between the screw and said member and supported for movement in said space along a line parallel with the axis of the screw, and anti-friction motion transmitting means engaged by the screw and guided by the carrier along said line in actuating relation to the carrier and driven member, and in a position to transmit thrust pressure upon the driven member substantially in a plane which includes the axis of the screw and the point of engagement with the driven member in all positions of said carrier and driven member.

21. In a steering gear, a worm cam screw, comprising the combination with a spindle, of a helically coiled spring bar having a flat inner face in binding frictional pressure engagement with the spindle to fixedly anchor the helix to the spindle.

22. In a steering gear, a worm cam screw, comprising the combination with a spindle having fixed heads, of a helically coiled spring bar provided with terminal portions anchored in the spindle heads, and the intermediate portion having a flat inner face in binding frictional pressure engagement with the spindle to fixedly anchor the helix to the spindle in cooperation with the anchorage of its ends in the spindle heads, said helix having outer surfaces concavely conformable to the surface of a motion transmitting ball of a size adapted to be supported and actuated by the helix out of contact with the spindle.

23. In a steering gear, the combination with a screw and a longitudinally grooved rocker arm, of an interposed carrier movable only along a line substantially parallel to the axis of the screw and in a plane of direct thrust between the screw and rocker arm substantially parallel with the axis of the rocker arm swinging movement, and means guided by the carrier for transmitting motion continuously in said plane from the screw to the carrier and rocker arm.

24. In a steering gear mechanism, the combination with a driving worm cam and a rock shaft having an arm extending transversely along one side of the worm cam in a position for swinging movement in a plane substantially parallel to the axis of the worm cam, of a ball carrier interposed in the space between said worm cam and arm and supported for movement along a line parallel with the axis of the worm cam, and ball means for transmitting motion from the worm to the carrier and arm in a resultant line of thrust substantially in a plane parallel with the axis of the rock shaft and including the axis of the worm cam in all positions of the carrier and arm.

25. In a steering gear, the combination with a gear casing providing a guideway, a screw rotatable within said casing about an axis substantially parallel with the guideway, a rock shaft provided with an arm movable in a plane substantially parallel with and adjacent said screw with the guideway interposed between the arm and screw, of a ball carrier slide controlled as to its movement by said guideway, a ball held by said carrier in mesh with said screw in motion transmitting relation to said arm, means comprising said guideway whereby the ball is held by the carrier substantially in the direct line of thrust between the screw and carrier in all positions of the driven member, and a thrust bearing at the end of the rock shaft adapted to receive the thrust transmitted by said ball with substantially minimum resistance to rocking movement of the driven shaft and arm.

B. WICKLIFFE TWYMAN.